United States Patent

[11] 3,568,050

| [72] | Inventor | Douglas L. Dill |
| | | Parks Township, Armstrong County, Pa. |
| [21] | Appl. No. | 829,040 |
| [22] | Filed | May 29, 1969 |
| [45] | Patented | Mar. 2, 1971 |
| [73] | Assignee | United States Steel Corporation |

[54] METHOD FOR MONITORING FERROMAGNETIC MATERIAL TEMPERATURE ABOVE THE CURIE POINT
2 Claims, 3 Drawing Figs.

[52] U.S. Cl. .................................................. 324/34, 73/362, 324/45
[51] Int. Cl. ..................................................... G01r 33/00
[50] Field of Search ........................................... 324/34, 45, 46; 73/362, 362 (CP), 362 (SC)

[56] References Cited
UNITED STATES PATENTS
1,697,148 1/1929 Spooner ..................... 73/362

| 2,736,822 | 2/1956 | Dunlap, Jr. .................... | 324/45 |
| 3,130,363 | 4/1964 | Camp et al. ................... | 324/34 |
| 3,340,467 | 9/1967 | Ha .............................. | 324/45 |
| 3,413,540 | 11/1968 | Vansant ....................... | 73/362 |

FOREIGN PATENTS
875,710 8/1961 Great Britain ............... 324/34

*Primary Examiner* — Rudolph V. Rolinec
*Assistant Examiner* — R. J. Corcoran
*Attorney* — Forest C. Sexton ABSTRACT: A method and apparatus for automatically measuring and/or recording the temperature of a paramagnetically susceptible material, such as steel during hot rolling, whereby the material is passed through a magnetic field and the magnetic field strength is changed in proportion to the material's paramagnetic susceptibility. A semiconducting probe measures the change in field strength, and through proper instrumentation the change in field strength is recorded as degrees of temperature.

FIG. I.
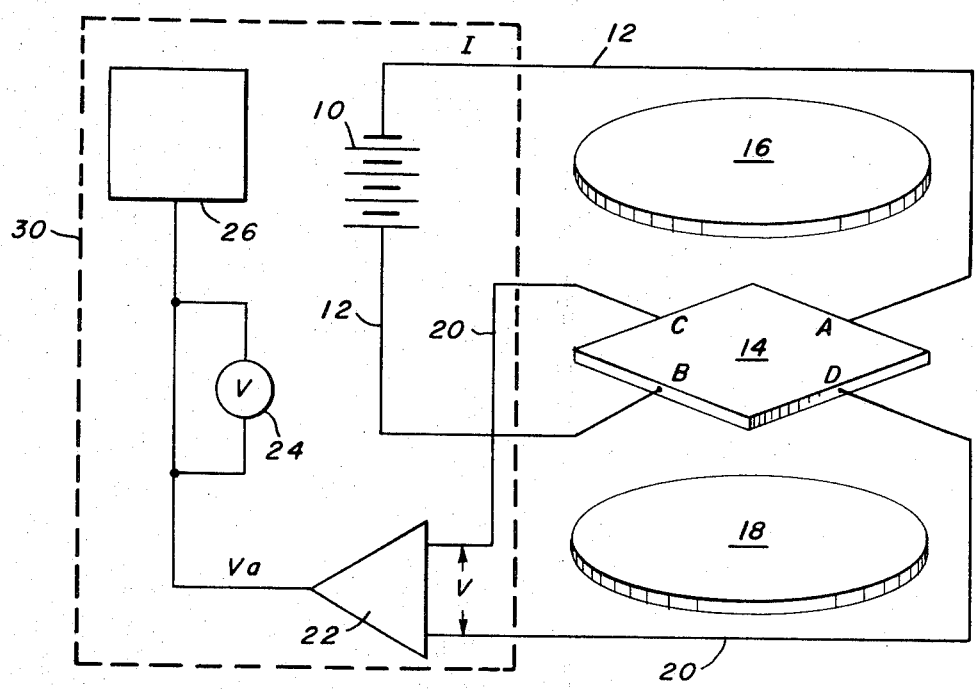
FIG. 2.
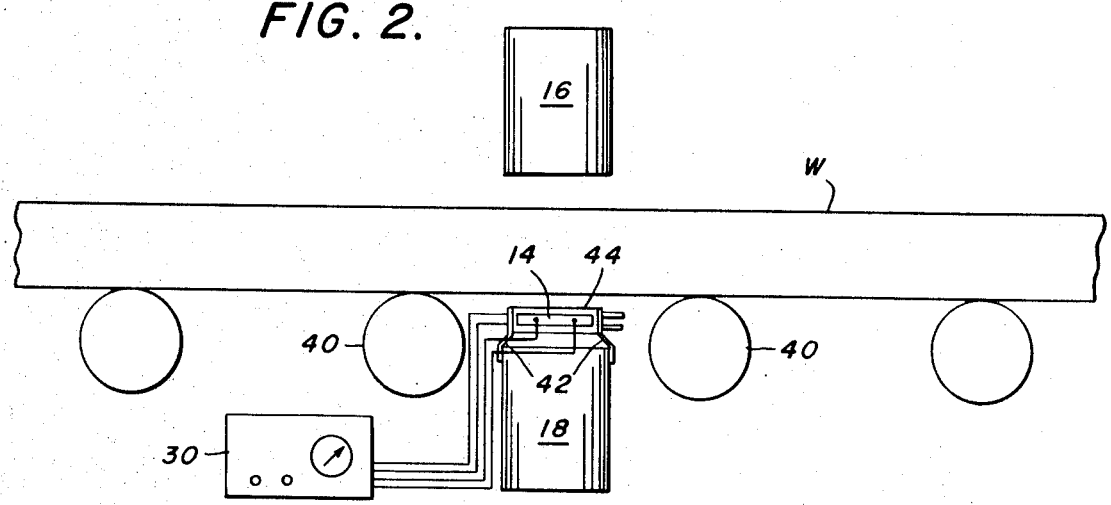
INVENTOR.
DOUGLAS L. DILL
By Forrest C. Sexton
Attorney

METHOD FOR MONITORING FERROMAGNETIC MATERIAL TEMPERATURE ABOVE THE CURIE POINT

BACKGROUND OF THE INVENTION

Pyrometers (i.e., high temperature recording devices) are generally of three basic types: thermoelectric type, optical (radiation dependent) type, and resistant type. In one way or another all of these pyrometers possess certain inherent disadvantages when used to determine the temperature of steel during hot rolling. Thermoelectric pyrometers cannot be easily or quickly used for this purpose because the thermocouple bead (junction) must be in contact with the point where the temperature is desired, and there maintained until thermal equilibrium is reached. Besides being awkward and time consuming, such thermoelectric pyrometers are known to be somewhat inaccurate at steel hot rolling temperatures since the bead may become oxidized. Optical pyrometers, which are dependent only upon radiation, are seriously affected by surface conditions. Thus, it is not possible to set one instrument accurately and have accurate measurements therefrom for all compositions and all temperatures. Since these instruments measure the radiant energy incident upon them, anything that cuts down this radiant energy, such as smoke, water film, dust, scale, etc., will effect the accuracy of the measurement. Furthermore, even under more ideal conditions, these instruments provide only a measurement of surface temperature.

SUMMARY OF THE INVENTION

This invention is predicated upon the fact that ferromagnetic materials, when heated to a temperature above the Curie Point, become paramagnetic materials. Paramagnetic materials are conventionally described by their "susceptibilities" which is a measure of the increase in magnetic moment caused by the application of a magnetic field. For the normally ferromagnetic materials, this susceptibility is dependent upon the temperature of the particular material, and will follow the Curie-Weiss Law. Accordingly, I have developed a method and apparatus for instantly measuring and/or recording the temperature of steel during hot rolling whereby the steel is allowed to pass through a magnetic field of known strength. This will cause change in the field strength which is directly proportional to the paramagnetic susceptibility of the steel. Since the paramagnetic susceptibility of the steel is directly related to its temperature (above the Curie Point), the change in magnetic field strength will be directly related to the steel's temperature. Hence, by proper calibration of magnetic strength recording instrumentation, a direct reading in degrees of temperature can be provided.

Accordingly it is a primary object of this invention to provide a new and improved method of pyrometry for use on materials exhibiting a temperature dependent paramagnetic susceptibility.

It is another primary object of this invention to provide a new and improved pyrometer for use on materials exhibiting a temperature dependent paramagnetic susceptibility.

It is a further primary object of this invention to provide a new and improved pyrometric method and apparatus for use on materials having a temperature dependent paramagnetic susceptibility which accurately measures the total average temperature of the body and not just the surface temperature, which need not contact the body, which gives an instant reading and thus need not wait for thermal equilibrium to develop, and which is not influenced by radiation screening caused by smoke, water film, dust, scale, etc.

BRIEF DESCRIPTION OF THE DRAWINGS

FIG. 1 is a schematic circuit diagram of a magnetic pyrometer built in accordance with this invention;

FIG. 2 is a simplified elevational view schematically showing the magnetic pyrometer of FIG. 1 conceptionally installed at a hot slab rollout table;

DESCRIPTION OF THE PREFERRED EMBODIMENT

Figure 3:
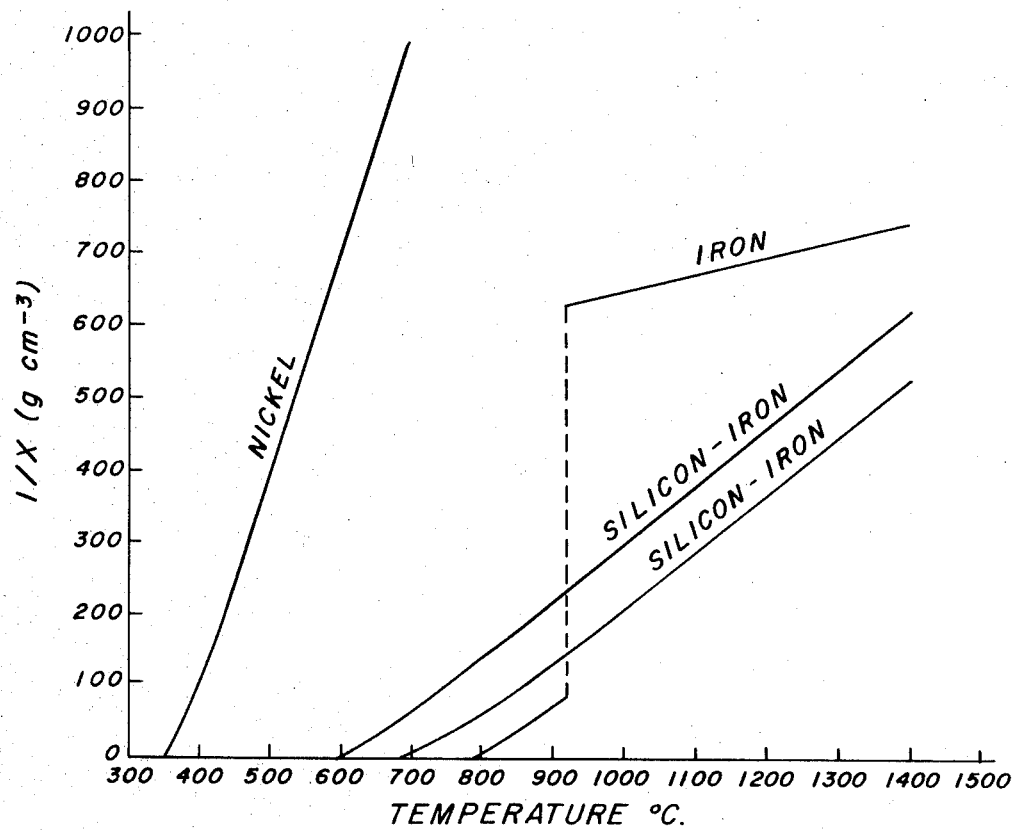
FIG. 3 is a graph of experimental data showing the inverse paramagnetic susceptibility of iron, two iron-silicon alloys and nickel.

As noted above, when ferromagnetic materials are heated to a temperature above the Curie Point (approximately 1420° F. for pure iron) the material changes from a ferromagnetic material to a paramagnetic material. Paramagnetic materials are conventionally described by their "susceptibilities" which is a measure of the increase in magnetic moment caused by the application of a magnetic field, thus:

$$\text{Susceptibility } (S) = \frac{I}{H}.$$

where I is the induced magnetization of the sample and H is the externally applied magnetic field strength. This susceptibility may either be independent of the temperature of the sample or dependent thereon depending upon the material itself. When susceptibility is dependent upon temperature, as it is for ferromagnetic materials above the Curie Point, the susceptibility will follow the Curie-Weiss Law, namely:

$$I = \frac{CH}{T-\theta}, \text{ therefore } S = \frac{I}{H} = \frac{C}{T-\theta}$$

where C is the Curie constant, T is the absolute temperature of the sample, and $\theta$ is the Curie-Weiss temperature. In essence, this implies that susceptibility is substantially a straight line function of temperature. FIG. 3 shows this susceptibility-temperature temperature relationship for iron, nickel and two iron-silicon alloys. (The jump in the iron curve at approximately 900° C. is caused by a phase change in the material).

As is apparent from the FIG. 3 graph, paramagnetic susceptibility for ferromagnetic materials is not only dependent upon temperature, but is further dependent upon the chemical composition of the material itself. Therefore, each alloy composition will have its own curve for the susceptibility-temperature relationship. Nevertheless, once the chemical composition is known and the susceptibility-temperature relationship plotted as in FIG. 3, the temperature of that material (above the Curie Point) can be determined by ascertaining the material's paramagnetic susceptibility. As noted above, this susceptibility can readily be determined by inserting the heated body into a magnetic field of known strength and determining the change in strength of this magnetic field.

The apparatus of this invention, as schematically illustrated in FIG. 1, is constructed to create a constant magnetic field, and instantly record or measure any change in the field strength when a paramagnetic material is inserted within the field. To effect the latter, a "Hall Effect" device is disposed within the magnetic field, and readily responds to any change in the magnetic field caused by the presence of foreign material (i.e., paramagnetic material) interrupting or decreasing the magnetic field.

The "Hall Effect" is a manifestation of the Lorentz forces which in simple terms provides that if a unidirectional direct electric current is passed through a Hall device (i.e., certain conducting and semiconducting bodies) which is further subjected to an external magnetic field perpendicular to the current flow, a second electrical potential is created within the device perpendicular to both the electric current and the magnetic field. Hence, the combined action of the two applied transverse forces, i.e., electric current and magnetic field, causes a shift in charged particles or holes within the device body perpendicular to the two applied forces.

An applicable equation for a practical Hall device is:

$$V = KIH$$

where V the Hall device output potential is the product of K the systems sensitivity constant, I the applied direct current, and H the effective applied magnetic field perpendicular to I. Since K is constant and if the current I is constant, the Hall device output voltage V will be a function of only H, the magnetic flux density. Therefore, any change in the magnetic flux density H, as may be caused by the presence of a paramagnetic material, will cause a change in the Hall device output voltage V. If the presence of paramagnetic material does cause the magnetic flux density H to change, this change in flux density is a function of the paramagnetic material's susceptibility. Therefore, the change in the Hall device output voltage V is also a function of this same susceptibility. Therefore, with proper instrumentation and calibration thereof to impute the susceptibility-temperature relationship of the paramagnetic material, the change in the Hall device output voltage V can be directly recorded as degrees of temperature of the paramagnetic material.

Considering the details of this invention, one embodiment as schematically illustrated in FIG. 1, essentially comprises a constant direct current power source 10 having a pair of terminal leads 12 secured to opposed ends A and B of a Hall device 14. When activated, power source 10 will supply a constant, direct current across the Hall device 14 between edges A and B. A pair of magnets 16 and 18 are positioned one above and one below the Hall device 14 with opposite poles facing each other so that a vertical and constant magnetic flux is created which passes through the Hall device 14 perpendicular to any current flowing between edges A and B on Hall device 14. The magnets 16 and 18 may be either permanent magnets or electromagnets.

When power supply 10 and the magnets 16 and 18 are activated, the combined action of the electric current flowing between edges A and B on Hall device 14 and the magnetic flux perpendicular thereto, will cause edges C and D on Hall device 14 to become oppositely charged. In most presently known Hall devices, This potential between edges C and D is known to be quite small. For example, a Hall device for measuring transverse magnetic fields and made of indium arsenide, manufactured by Siesmans and Halske AG (West Germany), Model No. EA-218, subjected to a practical current I of approximately 100 milliamperes and a magnetic flux density of approximately 10 kilogauss, will produce an output voltage V of approximately 85 millivolts. It is therefore preferred that this output voltage V be amplified. Hence, a pair of leads 20 secured to edges C and D on Hall device 14 transfer this potential V to a voltage amplifier 22 (such as Model 2470A, manufactured by Hewlett-Packard). The amplified voltage Va can then be observed on a voltmeter 24, and/or recorder on a recorder 26.

The power source 10, voltage amplifier 22, voltmeter 24 and recorder 26 are standard commercial items which are also available commercially in a combined form 30 known as a gaussmeter. Thus, in place of such individual components, one may use a commercially available gaussmeter 30 with a suitably graduated scale.

Since the current I from the power source 10 is constant and the magnetic flux density between magnets 16 and 18 is constant, the output voltage V from Hall device 14 will be constant. Therefore if amplification in amplifier 22 is constant, the amplified voltage Va will remain constant unless the current I or magnetic flux density acting on the Hall device is changed. Accordingly, when a paramagnetic material is inserted into the magnetic field between magnets 16 and 18, the magnetic flux density action on Hall device 14 is changed. In that event the amplified voltage Va is changed proportionally. As already explained, the change in magnetic flux density caused by the paramagnetic material, will be proportional to that material's susceptibility, which is in turn directly proportional to the material's temperature (i.e., if the paramagnetic material has a temperature dependent susceptibility as do ferroalloys above the Curie Point). Therefore, the change in amplified voltage Va is directly proportional to the temperature of the paramagnetic material inserted into the magnetic field. With proper calibration, depending upon the composition of the paramagnetic material, voltmeter 24 and/or recorder 26 can be made to give direct temperature readings.

As conceptually shown in FIG. 2, the Hall device 14 is disposed between a pair of rollers 40 on a material rollout table which supports a hot steel workpiece W, and is held in place by a pair of supports 42 which space it parallel to the upper polar surface of magnet 18. Although the Hall device 14 can be positioned either above or below, and possibly even beside the workpiece W, a position below the workpiece W, as shown, is preferred, since the distance between the workpiece and the Hall device will then be constant. This will eliminate possible variations in output voltage V due to a variation in spacing between the Hall device 14 and workpiece W. Nevertheless, in some situations, as for example near a scale breaker, where falling scale, water or dust is excessive, it may be preferable to position the Hall device 14 above the workpiece W to eliminate any possible decrease in the Hall device sensitivity and decrease the chances of its being damaged.

The second magnet 16 is suspended above the rollout table directly above and parallel to the magnet 18, and gaussmeter 30, or other such electronic device, is suitably wired to the Hall device 14 to supply the input current I and amplify and read the output voltage V. Accordingly, when workpiece W rolls out onto the rollout table and spans the space between rollers 40, the output voltage of Hall device 14 will be changed, and this change can be converted to a reading of temperature of the hot workpiece W as explained above.

For an accurate and uniform reading, it is not necessary that the steel be rolled to a uniform thickness, or that the Hall device gather 100 percent of the magnetic flux. It is only necessary that the Hall device gather the same percentage of the flux for each reading. To assure this, the Hall device should be always maintained at a uniform distance from the nearest magnetic surface and from the nearest surface of the hot steel. It should be noted that these principles have been applied in the FIG. 2 embodiment. In the event Hall device 14 is disposed above the workpiece W, a vertical adjustment means should be included thereon and on magnet 16 so that the Hall device and magnet 16 can be adjusted to maintain a constant distance from the upper surface of the workpiece W. Since the Hall device 14 should be maintained at a stationary position relative to magnet 16, such an adjustment can easily be provided by combining both items on one rigid adjustable structure. Such an adjusting or positioning structure can be most easily effected in the form of a rigid structure secured on to the top mill roll chocks so that Hall device 14 and magnet 16 are always fixed with respect to the top roll and hence, the upper surface of any hot steel rolled therethrough.

Another important consideration is that of temperature since presently known Hall devices at best have uniform response characteristics only up to about 100 to 110° C. Therefore, if the Hall device 14 is positioned reasonably close to the workpiece W so that it is apt to be heated to a temperature in excess of about 100° C., it will be necessary to provide means to keep the Hall device cool. This can be done by a suitable water cooling system or a suitable insulation and ventilation system. For example, a nonmagnetic water-cooled casement 44 around Hall device 14 as shown in FIG. 2 would be suitable. In the alternative, a ventilated, insulated casement would also suffice. It may further be necessary that the magnets 16 and 18 also be cooled and maintained at a reasonably constant temperature to assure a constant magnetic flux density. Magnet 18, or that magnet immediately adjacent to Hall device 14, can be cooled with the same system cooling the Hall device. An identical system can then be used to cool the other magnet.

It should be obvious that numerous modifications and additional features could be made and incorporated into the embodiment detailed above without departing from the basic concepts of this invention. For example, other forms of electronic equipment could be adapted for measuring and recording the Hall device output potential, numerous equipment cooling systems could be utilized, and of course the invention itself could be adapted to processes other than the hot rolling steel.

I claim:

1. A method of determining the temperature of a paramagnetic material having a known temperature dependent paramagnetic susceptibility comprising the steps of:
   a. creating a magnetic field of known constant strength across a defined space;
   b. introducing the paramagnetic material within said defined space to change the strength of said magnetic field in proportion to the temperature of said paramagnetic material;
   c. measuring the change in the magnetic field strength caused by said paramagnetic material; and
   d. deriving the temperature of said material from a predetermined relationship between material temperature and its affect on the magnetic field strength.

2. A method according to claim 1 wherein said change in magnetic field strength is determined by providing a Hall device within said magnetic field, passing a constant electric current through said Hall device perpendicular to the flux of said magnetic field to create an electrical potential within said Hall device perpendicular to both said magnetic flux and said current, measuring the magnitude of said electrical potential without said paramagnetic material within said magnetic field to derive a control value therefor, again measuring the magnitude of said electrical potential within said Hall device after said paramagnetic material has been introduced within the magnetic field, and measuring the change in magnetic field strength from the change in said electrical potential within the Hall device.